H. SUNDHAUSSEN.
UNLOADING DEVICE FOR THE SHAFT AND BEARING OF A VERTICAL GYROSCOPE.
APPLICATION FILED SEPT. 25, 1920.

1,404,329. Patented Jan. 24, 1922.

Inventor
Hermann Sundhaussen
By Knight Bros
Attys

UNITED STATES PATENT OFFICE.

HERMANN SUNDHAUSSEN, OF ESSEN, GERMANY, ASSIGNOR TO FRIED. KRUPP AKTIENGESELLSCHAFT, OF ESSEN-ON-THE-RUHR, GERMANY.

UNLOADING DEVICE FOR THE SHAFT AND BEARING OF A VERTICAL GYROSCOPE.

1,404,329.

Specification of Letters Patent. Patented Jan. 24, 1922.

Application filed September 25, 1920. Serial No. 412,897.

*To all whom it may concern:*

Be it known that I, HERMANN SUNDHAUSSEN, residing at Essen, Germany, a citizen of the German Republic, have invented a certain new and useful Improvement in an Unloading Device for the Shaft and Bearing of a Vertical Gyroscope, (for which I have filed an application in Germany on November 18, 1915,) of which the following is a specification.

The object of the present invention is to provide a very favorable device for unloading of shaft and bearing of a vertical spinning top or rotor of a gyroscope.

The accompanying drawing illustrates one embodiment of the invention as applied to a gyroscopic machine, in which—

Figure 1:
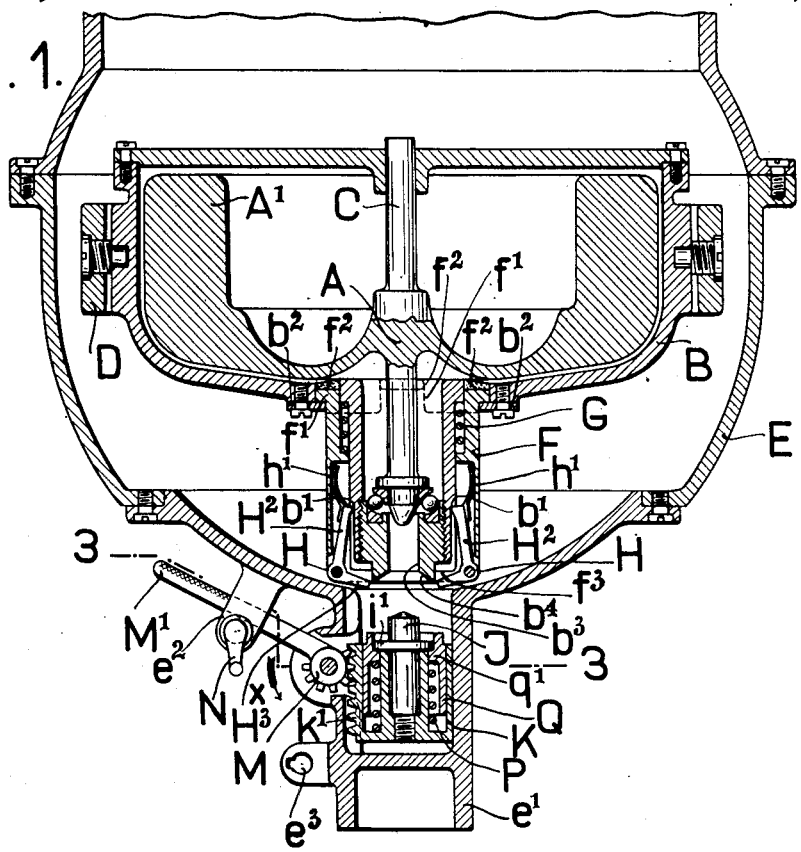
Figure 2:
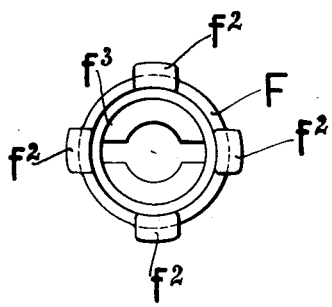

Fig. 1 shows an axial, longitudinal section of the gyroscopic machine;

Fig. 2 a detail in top plan view; and

Figure 3:
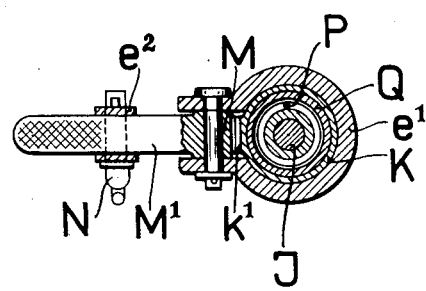

Fig. 3 a section along line 3—3 of Fig. 1, seen from above.

The rotor, designated by reference letter A, is revolubly mounted in a housing B on its upright shaft C. The housing B is suspended in well-known manner through the intermediary of a gimbal ring in a stationary casing E. On the portion of the housing B, which is situated opposite the lower portion of the flywheel A', of the rotor A, is carried a sleeve F, in axial alinement with shaft C and displaceable against a spring G. The sleeve F is provided with four projections $f'$ at the end adjacent the housing B, which projections engage with corresponding notches in the housing B and are provided on top with leather cushions $f^2$ (see Fig. 2). The sleeve F is secured against a displacement in the direction of the rotor A by means of several pawls H secured on the sleeve and actuated by flat springs $h'$, the pawls being shaped as bell-cranks with unequal arms, the longer arms $H^2$ of which engage with grooves $b'$ in the housing B. The sleeve F is prevented from any displacement in the opposite direction by a disk $b^2$ secured on the housing B, which disk contacts on its upper side with the projections $f'$.

On the lower portion of the housing B is to be found a boring $b^3$ with a conical bevel $b^4$, which is coaxial with the shaft C. Opposite this boring is situated a stud J of a diameter corresponding to that of the boring $b^3$ and slidably carried in the bottle-neck-shaped extension $e'$ of the stationary casing E, the stud J being secured in a socket K which is provided with a tooth-rack $k'$. A pinion M, provided with a lever M', meshes with the tooth-rack in such a manner that the socket K, together with the stud J, may be lifted in the direction of the boring $b^3$. In its highest and lowest positions the lever M' may be locked by a key N, which is intended to enter corresponding key holes $e^2$ and $e^3$ on the casing E.

In the socket K is slidably carried a sleeve Q, actuated by a spring P. This sleeve is provided with an annular shoulder $q'$ engaging under a collar $i'$ of the stud J, so that the sleeve must partake in any movement of the socket. The sleeve Q reaches with its upper end above the upper edge of the socket K. In the path of the sleeve Q is the sleeve F with its inwardly turned flange $f^3$ and also the pawls H with their short arms $H^3$, which extend a certain amount beyond. The amount which the arms $H^3$ reach beyond the face of the flange $f^3$ has been selected so that the pawls H will be pressed outwards from the grooves $b'$ by the sleeve Q, when the sleeve Q during displacement arrives in contact with the flange $f^3$.

Directly after the stopping or disconnection of the motor (not shown, but which may be of any usual type and have the usual means for operatively connecting it to the rotor) provided for driving the rotor A, the lever M' is turned downwards as soon as the key N has been removed from the key hole $e^2$. The pinion M will then be turned in the direction of the arrow $x$ (Fig. 1), and through the intermediary of the tooth-rack $k'$ the socket K, together with the stud J and the sleeve Q, will be pushed upwardly. If now the wheel A stands in inclined position as regards the stationary casing E, the stud J will strike the bevel $b^4$, press the wheel into central position and presses it fast in that position. Simultaneously the upper edge of the sleeve Q strikes against the arms $H^3$ of the bell-cranks H and the bell-cranks will thus be swung out of the grooves $b'$ through the assistance of the spring P. Immediately thereafter the sleeve Q comes in contact with the turned-in flange $f^3$ of the sleeve F and displaces the latter, against the spring G, as the connection between itself and the housing B has been broken after the swinging out of the bell-crank H. This displacement continues until the leather cushions $f^2$ arrive in contact with the flywheel A' of the wheel A. At this moment the lever M' has not yet arrived in its lowest position, so that upon further turning of the lever until the spring P is still further compressed, a certain force is consequently acting against the flywheel A' of the rotor A through the intermediary of the sleeve Q. The leather cushions $f^2$ thereupon act as brakes upon the rotor A and consequently bring it to rest. The spring P is calculated so that the pressure exerted against the rotor is approximately the same as the weight of the rotor when the wheel is standing still the rotor shaft C and the lower bearing will consequently be completely disengaged, whereby the additional advantage is gained that the rotor is supported on a spring bearing, so that any shocks occurring during transportation can have no injurious effect.

When the rotor has again to be started, the hand lever M' is turned in opposite direction to arrow $x$ after removing the key N. Then socket K will then be lowered through the intermediary of the pinion M and the tooth-rack $k'$, in which motion the stud J and the sleeve Q will partake. Actuated by spring G, the sleeve F then follows the same movement until it comes in contact with the disk $b^2$ through its projections $f'$. Through continued displacement of the socket K downwardly, the sleeve Q releases the arms $H^3$ of the bell-cranks, so that the bell-cranks again fall into the grooves $b'$ actuated by springs $h'$. The stud J simultaneously leaves the boring $b^3$. The rotor A and its housing B have consequently regained their complete freedom of movement.

If the described disengaging device should be applied to rotors that already at at rest, as, for instance, would be the case when a special brake is provided for the rotor then the projections on the sleeve F need not, naturally, be provided with leather cushions or their equivalent.

Claims:

1. A gyroscope comprising a vertical rotor, a rotor shaft resting by gravity upon a bearing at its end, a bearing for said shaft an axially movable member embracing said shaft about said bearing, normally disengaged from the rotor but suitable to take the load thereof.

2. In mechanism of the character described in claim 1, the axially movable member in the form of a sleeve, and the rotor housing having a neck whereon said sleeve is guided.

3. In mechanism of the character described in claim 2, the sleeve having shoe members serving as brakes for the rotor.

4. In mechanism of the character described in claim 1, the axially movable member having latches for holding it out of engagement with the rotor and means for disengaging said latches.

5. In mechanism of the character set forth in claim 1, a spring supported, lifting member disconnected from but axially shiftable to operative relation to said axially movable member.

6. In mechanism of the class described, the combination with a bearing of an axially movable rotor resting by gravity upon said bearing at its end, a lifting sleeve device therefor, and a lifting stand for said lifting sleeve device disconnectedly mounted with respect to said lifting sleeve.

7. In mechanism of the character described, the combination with a step bearing of a rotor said rotor having a shaft, a pivoted housing in which its shaft has step-bearing, said housing having a pendent neck having a guide surface, and a vertically movable stud to engage said surface to return to and retain in vertical position the rotor shaft.

8. In mechanism of the character described, the combination of a rotor, a housing therefor, a shiftable sleeve for taking the load of the rotor, latches for holding the sleeve, and a vertically movable member having means for engaging and releasing said latches, means for engaging and centering the housing and rotor and means for lifting the rotor shaft from its bearing.

9. Mechanism such as described in claim 8 having means for braking the rotor.

10. In mechanism of the class described the combination with a step bearing of a rotor, a gimbal supported housing in which its shaft has said step bearing, said housing having a pendent neck with a guide surface, and a vertically movable stud to engage said surface to return to and retain in vertical position the rotor shaft.

11. In combination with a step bearing, a rotor, a casing for said rotor a gimbal supported housing in which the shaft of said rotor has said step bearing, and a spring pressed means mounted on said casing for frictionally engaging said rotor.

12. In combination with a rotor, a casing for said rotor a gimbal supported housing in which the shaft of said rotor has a step bearing, and a spring pressed sleeve device about said shaft mounted on said casing for frictionally engaging said motor, and for withdrawing and supporting said rotor from its step bearing.

13. In combination with a rotor a casing for said rotor, a gimbal supported housing in which the shaft of said rotor has a spring bearing, a sleeve device about said shaft for withdrawing and supporting said rotor from its bearing, said device comprising a latch released engaging member for the withdrawing and support of said rotor, latches for said member and spring means for operating the latches of said member.

14. In combination with a rotor a casing for said rotor, a gimbal supported housing in which the shaft of said motor has a spring bearing, a sleeve device about said shaft for withdrawing and supporting said rotor from its bearing, said device comprising a latch released engaging member for the withdrawing and support of said rotor, latches for said member and spring means for operating the latches of said member, the tension of said spring means necessary to release said latch engaged member being practically equal to the weight of said rotor.

The foregoing specification signed at Essen, Germany this 16th day of June, 1920.

HERMANN SUNDHAUSSEN.

In presence of—
HANS GOTTSMANN,
JOSEF OLBERTZ.